US008468280B2

(12) United States Patent
Paillard (10) Patent No.: US 8,468,280 B2
(45) Date of Patent: Jun. 18, 2013

(54) AUDIO INTERFACE FOR CONTROLLING A MOTION PLATFORM (75) Inventor: Bruno Paillard, Sherbrooke (CA)

(73) Assignee: D-Box Technologies Inc., Longueuil (CA)

( * ) Notice: Subject to any disclaimer, the term of this patent is extended or adjusted under 35 U.S.C. 154(b) by 1639 days.

(21) Appl. No.: 11/876,471

(22) Filed: Oct. 22, 2007

(65) Prior Publication Data
US 2008/0104289 A1 May 1, 2008

Related U.S. Application Data (60) Provisional application No. 60/854,448, filed on Oct. 26, 2006.

(51) Int. Cl.
G06F 3/00 (2006.01)
G06F 5/00 (2006.01)
G09B 9/08 (2006.01)

(52) U.S. Cl.
USPC .............................................. 710/65; 434/55

(58) Field of Classification Search
USPC .............................................. 710/65; 434/55
See application file for complete search history.

(56) References Cited

U.S. PATENT DOCUMENTS

| 5,684,722 | A | * | 11/1997 | Thorner et al. | .................... | 703/3 |
| 5,857,986 | A | | 1/1999 | Moiyasu | | |
| 6,422,941 | B1 | | 7/2002 | Thorner et al. | | |
| 6,542,925 | B2 | * | 4/2003 | Brown et al. | ................. | 709/208 |
| 6,659,773 | B2 | | 12/2003 | Roy et al. | | |
| 7,356,082 | B1 | * | 4/2008 | Kuhn | ....................... | 375/240.16 |
| 2002/0115043 | A1 | * | 8/2002 | Baker et al. | ..................... | 434/30 |
| 2002/0154773 | A1 | | 10/2002 | Standard et al. | | |
| 2006/0046230 | A1 | | 3/2006 | MacDonald | | |
| 2007/0135967 | A1 | * | 6/2007 | Jung et al. | ..................... | 700/248 |

FOREIGN PATENT DOCUMENTS

| JP | 09-084957 | 3/1997 |
| JP | 2000-132494 | 5/2000 |
| JP | 2004/024301 | 1/2001 |
| WO | 99/40504 | 8/1999 |
| WO | WO 2004/102506 | 11/2004 |
| WO | 2006/113999 | 11/2006 |
| WO | 2007/143849 | 12/2007 |

OTHER PUBLICATIONS

Universal Serial Bus Device Class Definition for Audio Device; Release 1.0, Mar. 18, 1998; cover pg, p. 20-25.*

* cited by examiner

Primary Examiner — Henry Tsai
Assistant Examiner — Eric Oberly
(74) Attorney, Agent, or Firm — Norton Rose Canada LLP (57) ABSTRACT The present description relates to the interfacing of a computer with a motion platform using a USB audio-class computer peripheral. The computer peripheral receives a digital audio-format signal according to the USB specification and provides a motion signal to up to four motion platforms. As the computer peripheral is a USB audio-class peripheral, no device-specific driver is required to play motion synchronously with a movie or a video game. The general purpose audio driver included in the operating system of the computer is advantageously used and the computer peripheral can alternately be used with any operating system comprising such a general purpose audio driver, such as Windows 2000, Windows XO or Mac OSX. The computer peripheral is seen by the computer as a USB sound card.

12 Claims, 7 Drawing Sheets

AUDIO INTERFACE FOR CONTROLLING A MOTION PLATFORM

CROSS-REFERENCE TO RELATED APPLICATIONS

This application claims priority under 35USC§119(e) of U.S. provisional patent application(s) 60/854,448 filed Oct. 26, 2006, the specification of which is hereby incorporated by reference.

TECHNICAL FIELD

The present description relates to entertainment motion devices and more particularly to controlling of entertainment motion devices.

BACKGROUND OF THE ART

It is desirable to provide users with motion which is synchronized with a movie or a video game for entertainment. Such motion enhances the user experience.

In order to maximize the perceived effect of motion, the motion data must be delivered to the motion platform in synchrony with the audio and/or video program also being delivered via the audio and video interfaces of the same computer platform. When the duration of the motion effect is long, the rate of delivery of the motion stream must be regulated or locked to precisely match the rate of delivery of the audio and/or video streams.

In addition, in some applications where motion may be synthesized in real-time (gaming applications for instance), it is desirable to minimize the latency of the delivery of motion data to the motion platform.

Prior computer peripherals designed for the delivery of motion by a computer platform or gaming console, relied on custom hardware and custom software elements (drivers and APIs). They were difficult to use by software developers (for instance game developers) because these developers had to be knowledgeable about these custom software elements and the underlying motion technology. These peripherals were difficult to port from one computer platform to another, because complex drivers and APIs had to be redesigned for each new computer platform. Software developers specialized in the development of such drivers and APIs also had to be knowledgeable about the complex hardware of the computer peripheral and the underlying motion technology.

In addition, prior motion interfaces did not address the problem of precise regulation of the rate of delivery of the motion stream in a way that is developer-friendly. On some platforms, rate regulation was difficult to reconcile with the need for low-latency.

A Universal Serial Bus (USB) is a serial bus standard for a computer to interface with various devices and computer peripheral. The USB provides a user-transparent interface for computer peripherals such as mouse devices, keyboards, digital cameras, printers, external storage, sound cards, etc. The USB Implementers Forum advantageously provides a specification for generic USB audio-class devices, such as a USB sound card, thereby encouraging the development of generic audio drivers on many computer platforms, to allow the control of USB sound devices from different manufacturers. There is currently no such USB specification for interfacing with a motion platform controller.

In addition, the USB Audio-Class specification properly and intrinsically addresses the problems of low playback latency and rate of delivery regulation in digital audio interfacing because these problems are germane to the field of computer audio. It results that solutions to these two problems are built-in in generic or custom audio drivers and APIs.

SUMMARY

The present description relates to the interfacing of a computer with a motion platform using a USB audio-class computer peripheral. The computer peripheral receives a digital audio-format signal according to the USB specification and provides a motion signal simultaneously to a plurality of motion platforms. The peripheral locally manages each motion platform using the appropriate communication and control protocol, with minimal computer intervention.

As the computer peripheral is a USB audio-class peripheral, a generic driver is often provided for the specific computer platform by the manufacturer of the operating system, which is advantageous to the manufacturer of the USB audio-class peripheral. When no generic driver is provided for a given computer platform, the task of developing a custom driver is facilitated by the fact that USB audio-class devices are common and well known devices in the software development community.

The implementation of motion functionality by a software developer, at the level of a user-mode application (audio/video playback or video game for instance), is facilitated by the fact that most software developers are already familiar with the generic audio APIs often provided by the manufacturer of the operating system. For example, on Windows, generic audio APIs include the Wave API and the DirectSound API. Many already existing software modules, and even sometimes complete applications, can be used without modification to play motion with the proposed interface, thereby greatly simplifying the software development process related to the implementation of motion.

The computer peripheral is seen by the platform as a typical USB sound card. Most of its parameters are adjustable through the audio configuration user-interfaces of the computer platform, when they exist. It can be accessed through any of the audio APIs provided by the platform. In most instances, it can be accessed by existing sound applications. This is limited only by the capabilities of the applications.

According to one aspect, there is provided an audio-class computer peripheral to be connected to a computer having a general-purpose audio driver and for providing a motion signal from a digital audio-format signal in order to control a motion platform using the computer. The computer peripheral comprises a computer interface and a motion platform interface. The computer interface is for receiving the digital audio-format signal to be provided using the general-purpose audio driver, the digital audio-format signal comprising motion samples, and for extracting the motion samples from the digital audio-format signal. The motion platform interface is for producing, from the motion samples, the motion signal for controlling movements of the motion platform, thereby controlling the motion platform.

According to another aspect, there is provided a method for providing a motion signal from a digital audio-format signal comprising motion samples and provided by a computer having a general-purpose audio driver, in order to control a motion platform. The digital audio-format signal produced using the general-purpose audio driver and comprising a stream of motion samples is received. The stream of motion samples is extracted from the digital audio-format signal. The motion signal adapted for controlling movements of the motion platform using the stream of motion samples is then outputted.

According to another aspect, there is provided a method for controlling a motion platform using a computer having a general-purpose audio driver. Motion samples representative of movements to be performed by the motion platform are provided. A digital audio-format signal is provided using the general-purpose audio driver, the digital audio-format signal comprising the motion samples. A motion signal is outputted for controlling the motion platform, from the motion samples and using the digital audio-format signal.

According to another aspect, there is provided a computer system for controlling a motion platform comprising: a motion sample source for providing motion samples; a general-purpose audio driver receiving the motion samples and for producing a digital audio-format signal comprising the motion samples; and an interface for producing a motion signal for controlling the motion platform, from the motion samples and using the digital audio-format signal.

According to another aspect, there is provided a method for providing an audio-format motion signal to be used in controlling a motion platform. A stream of motion samples representative of movements to be performed by the motion platform is provided. The stream of motion samples is formatted in the audio-format motion signal according to a USB audio-class format specification. The audio-format motion signal is outputted.

It is noted that throughout this document, the movements produced by the motion platform is meant to comprise a motion component (low frequencies) and may also comprise a vibration component (high frequencies).

BRIEF DESCRIPTION OF THE DRAWINGS

It will be noted that throughout the appended drawings, like features are identified by like reference numerals.

DETAILED DESCRIPTION

Figure 1:
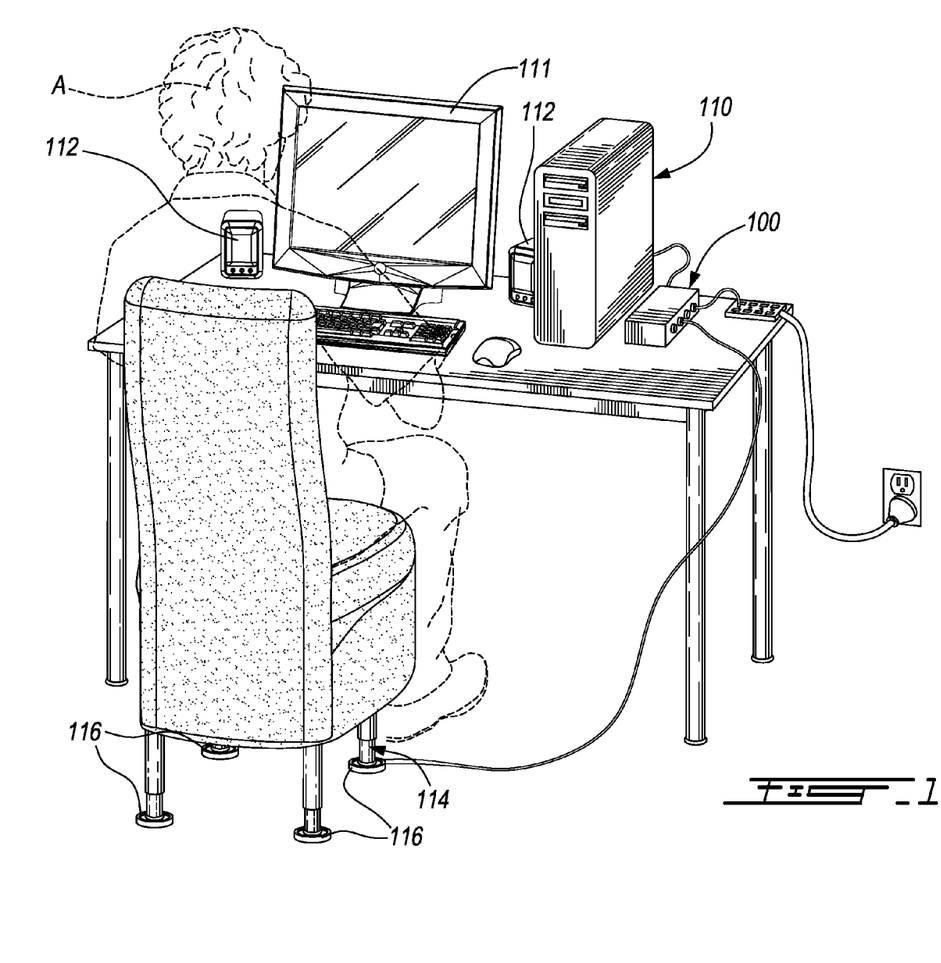
FIG. 1 is a schematic illustrating an example use of a motion platform for providing a user with motions synchronized with an audio/video stream.

FIG. 1 illustrates the use of a motion platform for providing a user A with motion synchronized with a video/audio program, video game or the like. The interfacing device 100 is an audio-class USB peripheral that can play motion on a motion platform 114. The interfacing device 100 may actually manage up to four motion platforms. It does not require a specific driver to play motion on most computers and operating systems. Instead it uses the generic USB audio driver of the computer 110 to which it is connected. Examples of platforms providing a generic audio driver include Windows 2000, Windows XP or Mac OSX.

The interfacing device 100 is seen by the computer platform as a typical USB sound card. Most of its parameters are adjustable through the audio configuration user-interfaces of the computer platform, when they exist. It can be accessed through any of the audio APIs provided by the platform. On Windows, these include the Wave API and the DirectSound API.

The user A watches a movie or plays a video game using a computer 110, typically a personal computer (PC). Accordingly, a video is being displayed on a video monitor 111 and sound effects are produced by speakers 112. The computer 110 also provides a stream of motion samples synchronized with the video display and the sound play and representative of a motion to be provided to the user A using a motion platform 114. The stream of motion samples is outputted as a digital audio-format signal. An interfacing device 100 is connected to the computer 110 using any interface standard. One suitable standard is the USB standard, the interfacing device 100 then being a USB audio-class peripheral, external to the computer, Alternatively, the interfacing device 100 may be provided as an expansion card communicating with the computer using the Peripheral Component Interconnect (PCI) standard.

The interfacing device 100 is a computer peripheral for the computer 110 to interface with the motion platform 114. The interfacing device 100 receives the audio-format signal comprising streams of motion samples provided as channels in the audio-format signal, and provides a motion signal for controlling movements of the motion platform 114. The interfacing device 100 is capable of providing a motion signal adapted to various types of motion platforms 114. One possible motion platform 114 comprises four motion actuators 116 for imparting movements to a chair, each motion actuator being located under one of the four corners of the chair, i.e., each leg. The imparted motion includes a heave motion, a roll motion, a pitch motion and any combinations thereof. In order to support all the listed motions, the audio-format signal comprises at least three channels, each channel having one stream of motion samples representative of the respective motion to be provided to the user A.

Alternatively, another motion platform 114 can comprise one motion actuators 116. When one actuator only is used, the imparted motion is limited to one of a heave motion, a roll motion or a pitch motion. Another suitable motion platform comprises two rear actuators and a front-center swivel.

As will be described further below, the interfacing device 100 is capable of adapting an audio-format signal comprising more or less channels than the ones supported by the connected motion platform 114 by eliminating motions unsupported by the motion platform 114 or by extrapolating actuator positions not provided in the channels.

It is noted that the motion provided to the user may be only synchronized with the video display independently of the sound effect if, for example, the movie or the video game is silent.

Figure 2:
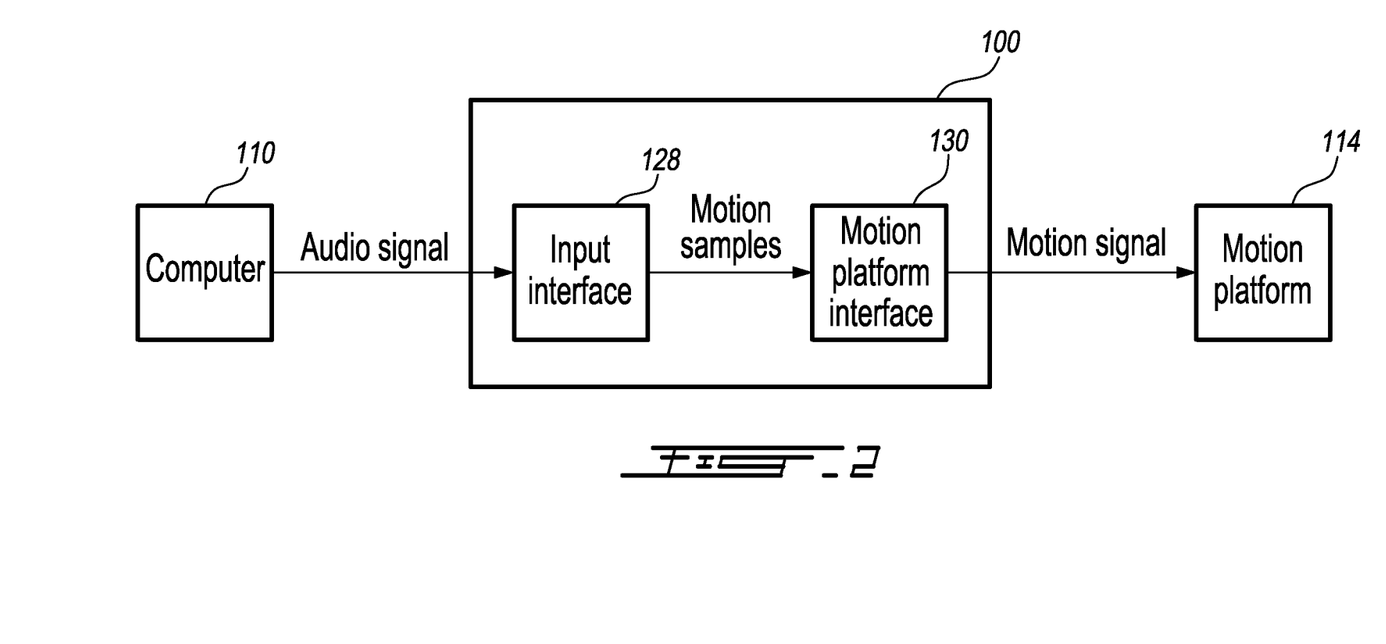
FIG. 2 is a block diagram illustrating the main components of an example computer peripheral for interfacing between a computer and a motion platform by providing a motion signal from a digital audio-format signal.

FIG. 2 illustrates the main components of the interfacing device 100 for interfacing between a computer 110 and a motion platform 114 by providing a motion signal from a digital audio-format signal. The interfacing device 100 comprises a computer interface 128 and a motion platform interface 130. The computer interface 128 receives the digital audio-format signal provided by the computer. The digital audio-format signal has channels each comprising a stream of motion samples. In the simplest form of the interfacing device 100, each channel corresponds to one motion actuator of the motion platform 114 and each stream of motion samples corresponds to a stream of actuator samples for controlling one actuator. The computer interface 128 extracts the streams of motion samples from the digital audio-format signal.

The motion platform interface 130 produces a motion signal from the extracted streams of motion samples. The motion signal is provided to the motion platform 114 for controlling movements of motion platform 114. The motion signal comprises a stream of actuator samples for each actuators of the motion platform 114.

Figure 3:
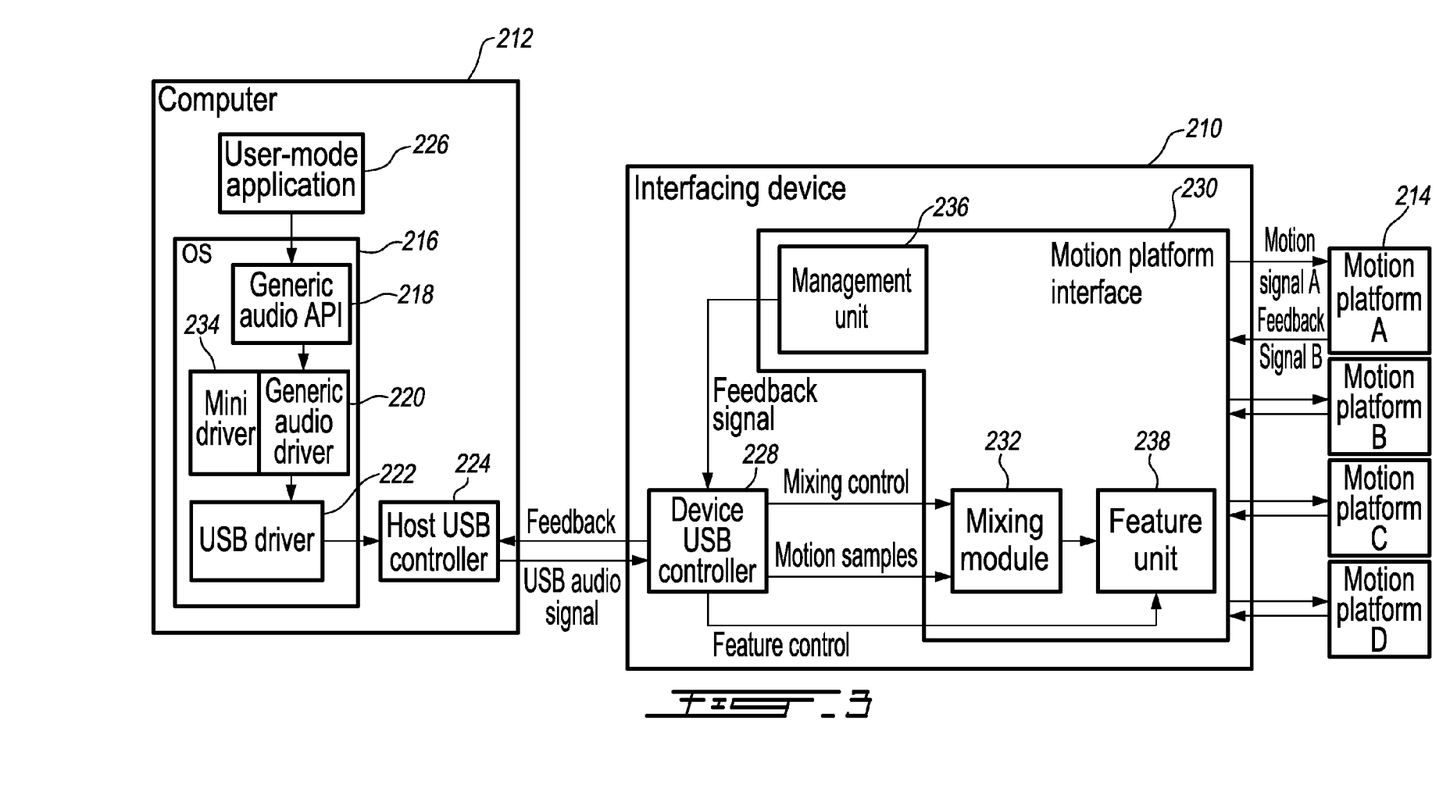
FIG. 3 is a block diagram illustrating an example computer peripheral interfacing between a computer and a motion platform wherein the computer peripheral is a USB audio-class peripheral and the computer provides a USB audio signal.

FIG. 3 illustrates an interfacing device 210 interfacing a computer 212 with up to four motion platforms 214, according to another embodiment. The interfacing device 210 is seen by the computer 212 as a USB audio-class peripheral and the computer 212, typically a PC, provides a USB audio signal to the interfacing device 210 which produces a motion signal accordingly, for controlling up to four motion platforms 214. The USB audio signal may optionally be formatted according to any suitable compression standard such as, for instance, Dolby or DTS standards.

In this embodiment, the motion signal is the same for each motion platform which performs the movements. In this embodiment, each motion platform 214 has four motion actuators but it should be appreciated that more or less motion actuators could be used in an alternative motion platform. As will be discussed hereinbelow, the USB audio signal has two to four channels each comprising a stream of motion samples, which the computer 212 regards as typical channels of streams of audio samples, without making any difference in the way it handles it. In another embodiment, a plurality of platforms could each perform a different motion if the USB audio signal comprised a group of channels for each platform to be controlled.

The computer 212 comprises an operating system 216 such as Windows 2000, Windows XP, Mac OSX or any operating system having a general purpose audio driver 220 for interfacing with any sound device, a general purpose audio API 218 and a USB driver 222. The audio signal produced by the audio driver 220 is provided to the interfacing device 210 though a host USB controller 224 controlled by the computer using the USB driver 222 according to the USB specification.

Streams of motion samples are provided by a user-mode application 226 such as a media player for playing a prerecorded video, a video game or any other application which provides synchronized video display, sound effect and motion sequence for a multi-media experience. For example, a video track, a sound track and a motion track may all be provided as a recorded file. The video track is played on the video monitor and the sound track is played on the speakers as known in the art. The motion track is considered as a second sound track that is to be played using the interfacing device 210.

In the case of a video game, the video track, the sound track and the motion track are all provided by the video game application as a function of the user input and events in the game.

The user-mode application 226 uses the general purpose audio API 218 provided with the operating system 216 to play the read or produced stream of motion samples as if it was a stream of audio samples. In other words, the computer 212 provides a USB audio signal comprising the motion samples, according to the USB specification. The USB audio signal comprises two to four streams of motion samples that are to be decoded by the interfacing device 210 to generate the corresponding motion using a motion platform 214 as will be discussed hereinbelow.

All functionalities related to the motion platforms 214 may not be supported by the general purpose audio driver 220 and the general purpose audio API 216. Unsupported functions may be functions related to the monitoring of the motion platforms and the fault management. Accordingly, an expansion of the general purpose audio driver, i.e., a mini-driver 234, and/or an expansion of the general purpose API may be provided to expand the general audio functionalities.

The interfacing device 210 comprises a computer interface, i.e., the device USB controller 228 for receiving the USB audio signal according to the USB standard and a motion platform interface 230 for producing a motion signal comprising streams of actuator samples for controlling each actuator of the motion platforms 214. A signal splitter (not shown) splits the motion signal to provide it to each of the four motion platforms 214. The interfacing device 210 also comprises a management unit 236 for providing control commands to each motion platform 214 and for monitoring and managing the motion platforms 214 according to actuator feedback received from each motion platforms 214. The device USB controller 228 extracts the channels comprising streams of motion samples from the USB audio signal and communicates them to the motion platform interface 230. The motion platform interface 230 comprises a mixing module 232 for mixing channels of stream of motion samples to provide four streams of actuator samples for controlling each actuator of a motion platform 214.

As will be described hereinbelow, each channel may not correspond to one motion actuator. The mixing module provides various mappings between the channels of the USB audio signal and the four actuators of each motion platforms 214. One of such mapping is a direct mapping wherein each channel corresponds to one actuator (rear-right, rear-left, front-right and front-left) of a motion platform 214. In another mapping, three channels are received, respectively corresponding to heave, pitch and roll. The mixing module 232 mixes the channels to convert the received heave, pitch and roll motion samples into actuators positions. The mixing function is implemented according to the up/down mix unit as defined by the USB audio class specification. As will be discussed in more details below, other mapping schemes are provided where a combination of the channels is converted into a number of streams of actuator samples corresponding to the number of actuators. The mixing function is controlled using a mixing control signal.

The motion platform interface 230 also comprises a feature unit 238 receiving streams of actuator samples outputted by the mixing unit for applying some feature functions such as bass-boost, volume and muting functionalities as will also be described hereinbelow, to the streams of actuator samples. These functions are controlled according to a feature control signal.

Each motion platform 214 returns a feedback signal through the motion platform interface 230, to the management unit 236 for monitoring and management purposes. The motion platforms 214 are mostly managed at the interfacing unit 210 but feedback data is also returned to the computer 212 for fault monitoring, for instance.

Further to receiving a USB audio signal and extracting the streams of motion samples, the device USB controller 228 receives configuration controls (such as mixing and feature controls) from the computer 212 and also communicates feedback data, such as fault flags or vital signs of the actuators, to the computer 212 using the generic audio driver 220 and the USB protocol. Part of the feedback information may not be specifically supported by the generic audio infrastructure of the operating system 216 and may need to be managed by a custom driver or mini driver 234.

Because the interfacing device 210 is seen by the computer 212 as a typical sound card, most of its parameters are adjustable through the generic audio configuration user-interfaces of the operating system 216, if they exist. The parameters can also be accessed through any of the audio APIs provided by the operating system 216.

Figure 4:
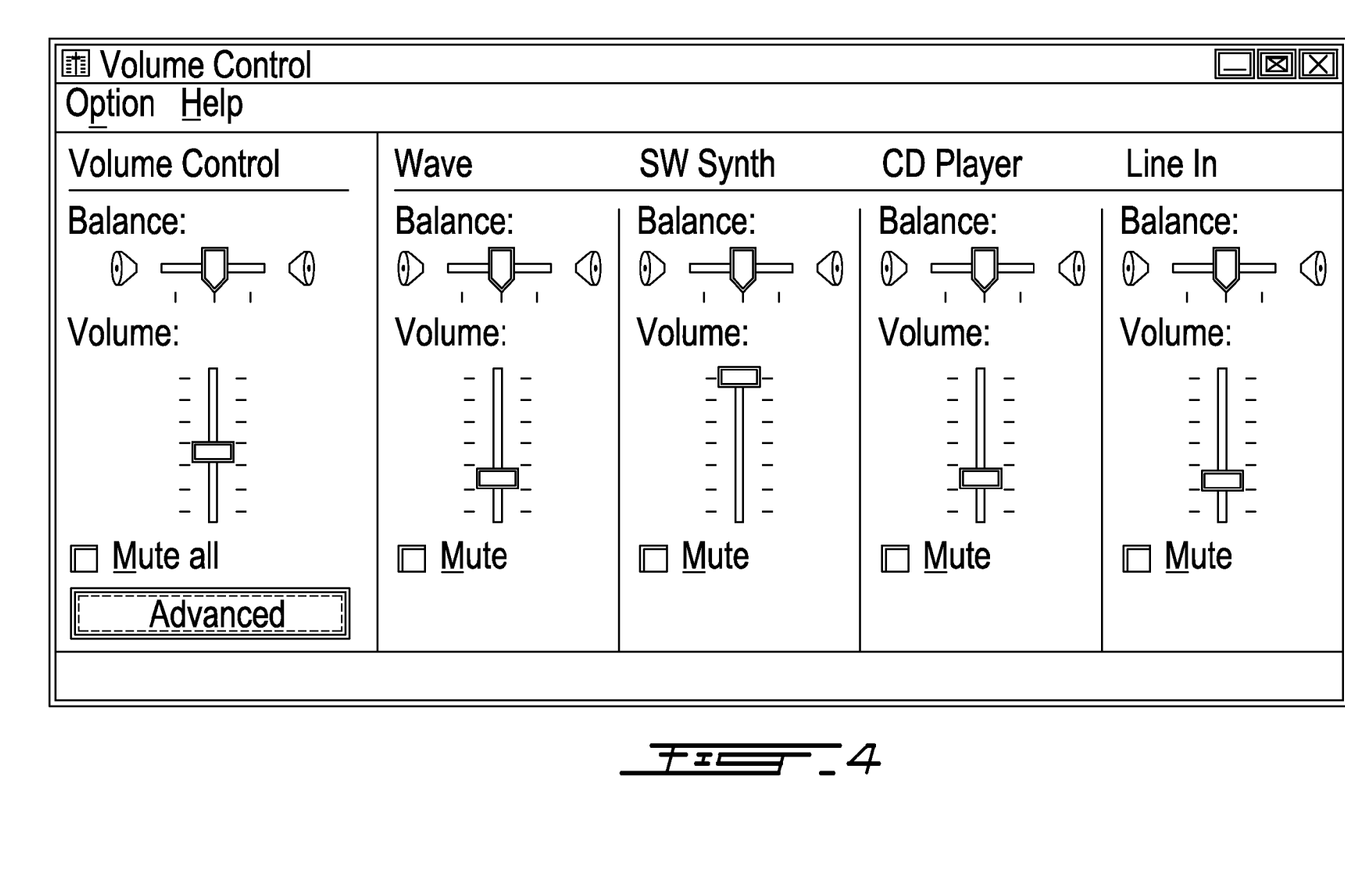
FIG. 4 is an image showing of an example audio configuration user-interface.

FIG. 4 shows a typical audio configuration user-interface from Windows™ that can be used to adjust the volume of audio speakers. The same audio configuration user-interface is used by the user A, according to an embodiment, to adjust the amplitude of the motion provided by the motion platform 214. The motion platform can also be put on standby manually using the mute functionality as defined by the generic audio driver 220 and accessible using the mute check box.

Figure 5:
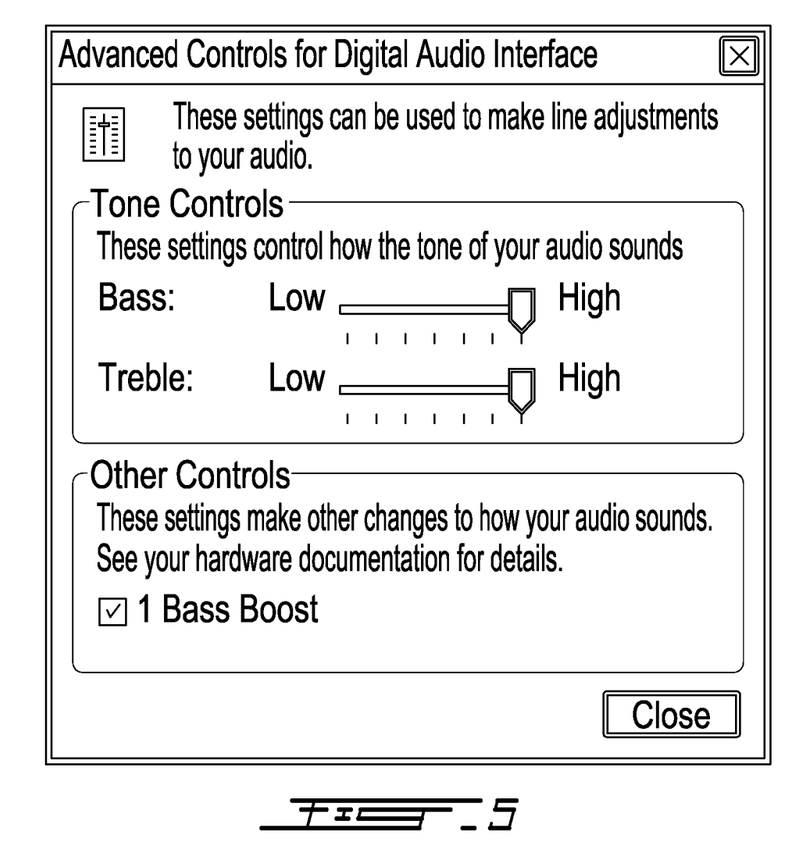
FIG. 5 is an image showing advanced controls of the audio configuration user-interface of FIG. 4.

FIG. 5 shows advanced controls of a typical audio configuration user-interface that is used to adjust bass/treble settings and to select a bass-boost filter applied by the feature unit 238. In a motion platform application, the motion generated by the motion platform comprises a motion component (low frequencies) and a vibration component (high frequencies). The bass/treble settings respectively adjust the relative importance of motions and vibrations of the motion generated by the motion platform. The bass/treble settings adjust the filtering parameters of the bass and the treble frequency filters to be applied-to the stream of motion samples.

The interfacing device 210 automatically controls one to four motion platforms 214 without user intervention. When the interfacing device 210 takes control of a motion platform 214, the platform is normally in a standby state by default. The motion platform 214 is only placed in its active traffic state when motion is being played. For energy saving, the interfacing device 210 automatically sets the motion platform back in the standby state when no motion is played for a preset length of time (ten minutes for instance). The interfacing device 210 does not set the motion platforms 214 into the active traffic state if the mute control is set (see the mute setting described below).

Whenever a platform experiences a fault, as communicated by the motion platform 214 to the interfacing device 210 using the feedback signal, the interfacing device 210 automatically sets the motion platform 214 in the standby state. The interfacing device 210 then attempts to clear the fault and resume the motion for three consecutive attempts. After three attempts at restarting, if a fault is still detected the motion platform 214 is kept in the standby state and the fault is displayed. The fault can be cleared by activating and deactivating the mute control.

Whenever the mute control is activated, all platforms are lowered to the standby state. Upon deactivation of the mute control, the platforms are only set to the active traffic state if motion is being played.

As stated hereinabove, the mixing module 232 provides various mappings between the channels of the USB audio signal and the four actuators of each motion platforms 214. In a mix-disabled setting, a direct mapping is provided, i.e., each channel corresponds to one of the four actuators (front-left, front-right, rear-left and rear-right) of a motion platform 214. The stream of motion samples of each channel is sent directly to the corresponding actuator without any transformation other than a scaling transformation for adjusting the volume or other frequency filtering transformations such as bass/treble adjustment and anti-aliasing filtering, frequency filtering being considered as scaling transformations.

It is noted that each of the four actuators of a motion platform 214 is located on one of the four coplanar corners of the motion platform 214, e.g., one under each of the four legs of a chair, and that the position of the contact portions of the four actuators with the supported platform should be coplanar. Should the position of the contact points not be coplanar, the motion platform(s) 214 would twist or would be improperly supported (one or two actuators not supporting the motion platform). Consequently, in this mode, the set of four actuator positions should be checked upstream in software for coplanarity before providing the USB audio signal.

The mixing function is implemented according to the up/down mix unit as defined by the USB audio class specification. The mix-enable setting comprises three mixing modes: the 2-channel mode, the 3-channel mode and the 4-channel mode.

In the 2-channel mode, a first channel corresponds to the rear-left actuator and a second channel corresponds to the rear-right actuator. The mixing module 232 provides the actuator samples for the front-right and the front-left actuators by simulating a front-center swivel and insuring the coplanarity of the four actuators. Both channels have a dynamic range of −32 767 to +32 767 with no risk to saturate the actuators of the motion platform 214. In the 2-channel mode, the other two channels, if present in the USB stream, are ignored.

In the 3-channel mode, three channels are received, respectively corresponding to heave, pitch and roll. The mixing module 232 mixes the channels to converts the received heave, pitch and roll motion samples into actuators positions while ensuring the coplanarity of the four actuators.

The full dynamic range of −32 767 to +32 767 of the roll channel provides the full roll angular range. Positive values roll to the left. The full dynamic range of −32 767 to +32 767 of the pitch channel provides the full pitch angular range. Positive values pitch up. The full dynamic range of −32 767 to +32 767 of the heave channel provides the full vertical travel range. Positive values raise the motion platform. Although it is the simplest and most intuitive alternate setting, care must be exercised because some combinations of values can create saturations of one or more actuator. For instance a combined full heave and full pitch motion would produce saturations on the front actuators. The forth channel, if present in the USB stream, is ignored.

In the 4-channel mode, each channel corresponds to one of the four actuators, i.e., front-left, front-right, rear-left and rear-right. Even though it appears as though each actuator is independently controllable, a linear transform is applied to reduce the number of degrees of freedom from four to three and to ensure a coplanarity of the positions of the four actuators. Positions that are already in the same plane are not modified. Positions that would twist the platform are transformed into the closest achievable positions that ensure coplanarity. This is obtained by projecting to zero the "platform-twisting" component of the motion platform vector. Since positions that are in the same plane (positions that do not have a twisting component) are not modified, there is no risk of saturation of the actuators. However, for components that have a non-zero twisting component, the transform may create saturations for positions at the edge of the range.

Figure 6:
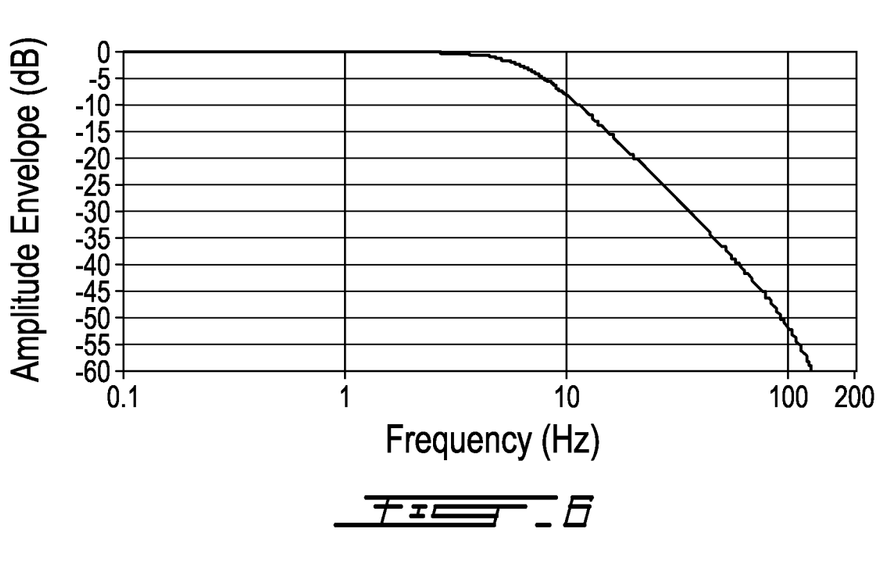
FIG. 6 is a graph illustrating a bass-boost filter.

As illustrated in FIG. 6, the feature unit 238 has a bass boost function to apply a calibrated low-pass bass-boost filter to the streams of actuator samples. The transfer function of the actuators is typically flat in position from 0 to 100 Hz, which causes the following difficulties. At high frequencies, i.e., between 10 and 100 Hz, a full amplitude wave requires large accelerations from the actuators. In practice, the actuators are limited to accelerations lower than the acceleration of gravity (+/−1 g), and such full-amplitude motion profiles, which would require larger accelerations, create distortions. At high-frequencies, the impression of vibration intensity of an arbitrary frequency signal is much more related to acceleration than it is to position. Therefore to obtain a constant impression of intensity from 10 to 100 Hz, independently of the frequency, it is necessary to progressively lower the motion amplitude as the frequency is increased.

The bass-boost filter is calibrated in gain and spectral shape to insure that no motion with an acceleration greater than the acceleration due to gravity (1 g) is applied to the actuators, which would saturate the actuator response. Furthermore, it scales the actuator samples so that the impression of force perceived by the user is only related to the signal amplitude, rather than a combination of amplitude and frequency. This simplifies the design or real-time synthesis of the motion samples. This calibrated filter is selected using the bass-boost feature unit as defined in the USB Audio-Class specification. It facilitates the work of motion designers by allowing them to use a specific amplitude for a specific impression of intensity, regardless of frequency.

The bass-boost filter is applied by default. The function can be defeated, for example, by deselecting the Bass-Boost control in the advanced controls of a typical audio configuration user-interface. Defeating the Bass-Boost function provides a flat frequency response in position from 0 to 100 Hz.

Furthermore, to avoid large discontinuities that can occur when motion is not started or stopped at a zero position of the actuators, a fade-in function is applied by the mixing module 232 when motion is started, and a fade-out function is applied when motion is stopped. The fade-in function progressively increases the play-back volume from zero to the selected volume in a few fractions of a second at the beginning of the motion. Because of the fade-in, motion signal that is present in the first few hundreds of milliseconds of motion may be masked. The fade-out function progressively decreases the play-back volume from the selected volume back to zero in few hundreds of milliseconds. If motion was not stopped at zero, this fade-out brings the actuators back to the zero position smoothly. Because the fade-out is only applied after the motion has stopped, it does not mask any motion signal at the end of the sequence.

Figure 7:
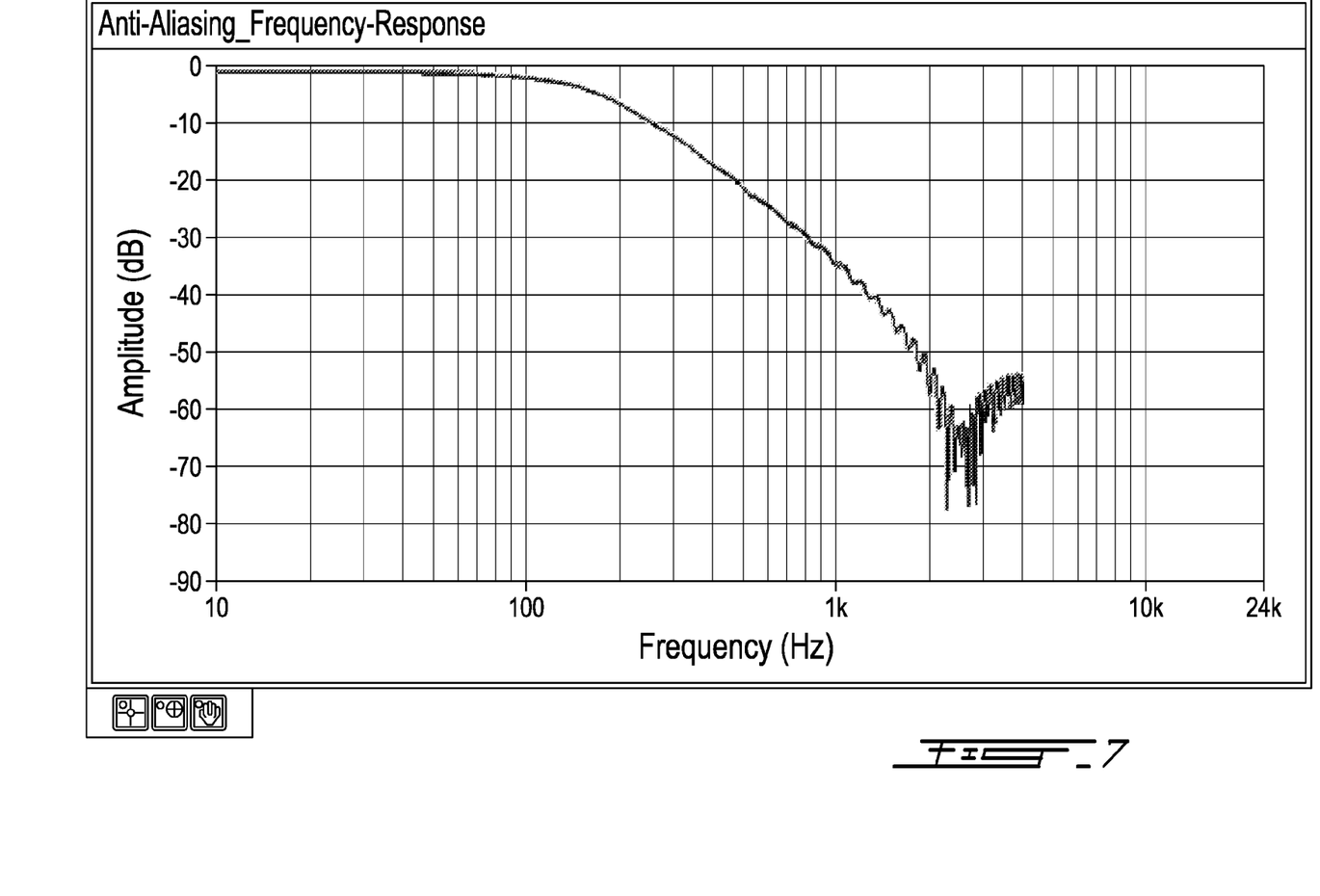
FIG. 7 is a graph illustrating a low-pass anti-aliasing filter.

In order to insure the integrity of the stream of actuator samples, all signal components above 100 Hz should be removed from the motion signal. As illustrated in FIG. 7, a low-pass anti-aliasing filter is applied to every channel by the mixing module 232. Depending on the requested sampling frequency, one of the following six filters is used: filter adjusted for 48 kHz, 32 kHz, 24 kHz, 16 kHz, 12 kHz and 8 kHz. When the sampling frequency is between any of these filtering values, the applied filter is not optimally adjusted. However, since there is a filter every half octave, the cutoff frequency cannot be off by more than 50% of the target frequency. The filters are not very sharp to keep the playback delay to a minimum. To obtain a sharper anti-aliasing filter, it may be advantageous to perform a pre-filtering on the audio signal in software before sending it to the interfacing device 210.

The native sampling frequency of the motion platform is 400 Hz. The use of a sampling frequency that is a multiple of 400 Hz provides best results. Other intermediate sampling frequencies are possible, but result in a slightly degraded signal quality.

While illustrated in the block diagrams as groups of discrete components communicating with each other via distinct data signal connections, it will be understood by those skilled in the art that the preferred embodiments may be provided by a combination of hardware and software components, with some components being implemented by a given function or operation of a hardware or software system, and many of the data paths illustrated being implemented by data communication within a computer application or operating system.

The structure illustrated is thus provided for efficiency of teaching the present preferred embodiment.

The embodiments of the invention described above are intended to be exemplary only. The scope of the invention is therefore intended to be limited solely by the scope of the appended claims.

What is claimed is:

1. An audio-class computer peripheral to be connected to a computer comprising a general-purpose audio driver and configured to provide a motion signal to control a motion platform using said computer,
   said motion platform comprises motion actuators configured to impart movement on said motion platform from a digital audio-format signal comprising channels with a stream of motion samples
   said computer peripheral comprising:
   a computer interface configured to receive said digital audio-format signal to be provided using said general-purpose audio driver, said digital audio-format signal comprising motion samples, and configured to extract said motion samples from said digital audio-format signal; and
   a motion platform interface configured to produce, from said motion samples, said motion signal configured to control movements of said motion platform, said motion platform interface comprising a mixing module configured to produce, using said channels, as said motion signal a stream of actuator samples configured to control each one of said actuators, said mixing module comprising a mix-enabled mode wherein said mixing module converts said streams of motion samples into said streams of actuator samples such that the position of the contact portions of said actuators with the motion platform are coplanar, wherein said mixing module provides at least one mapping between said channels and said actuators.

2. The computer peripheral as claimed in claim 1, wherein said computer interface is further configured to receive configuration commands from said computer.

3. The computer peripheral as claimed in claim 1, wherein said computer interface is further configured to communicate feedback data to said computer using at least one of said general-purpose audio driver and a custom driver.

4. The computer peripheral as claimed in claim 1, further comprising a management unit configured to provide control commands to said motion platform and configured to manage said motion platforms according to a feedback received from said motion platform.

5. The computer peripheral as claimed in claim 4, wherein said motion platform interface comprises a signal splitter configured to split said motion signal to a plurality of said motion platforms and wherein said management unit is further configured to provide control commands to each one of said motion platforms and configured to manage each one of said motion platforms according to a feedback received from each one of said motion platforms.

6. The computer peripheral as claimed in claim 5, wherein said mixing module comprises a mix-disabled mode wherein a number of said channels is equal to a number of said motion actuators, each one of said channels corresponding to one of said motion actuators, and wherein said mixing module is configured to produce a stream of actuator samples corresponding to each one of said channels by applying no more than scaling transformations.

7. The computer peripheral as claimed in claim 5, wherein said mixing module comprises a 3-channel mix-enabled mode wherein said digital audio-format signal comprises a first channel corresponding to a heave motion, a second channel corresponding to a pitch motion and a third channel corresponding to a roll motion.

8. The computer peripheral as claimed in claim 1, wherein said audio-class computer peripheral is an audio-class USB peripheral to be accessed by said computer using a general-purpose USB audio driver.

9. The computer peripheral as claimed in claim 1, wherein said computer comprises a general-purpose audio configuration interface in communication with said general-purpose audio driver, configured to receive user input to adjust at least one of a volume setting and a bass/treble setting, said digital audio-format signal comprising said at least one of a volume setting and a bass/treble setting and said computer interface being further configured to extract said at least one of a volume setting and a bass/treble setting, said motion platform interface comprising a feature unit configured to perform at least one of adjusting said streams of actuator samples to adjust an amplitude of movements of said motion platform according to said volume setting and applying predetermined bass and treble filters to said streams of motion samples to provide said streams of actuator samples.

10. The computer peripheral as claimed in claim 1, wherein said motion platform interface comprises a feature unit configured to apply a bass-boost low-pass filter.

11. The computer peripheral as claimed in claim 1, wherein said computer comprises a general-purpose audio configuration interface in communication with said general-purpose audio driver and comprising a mute control and wherein said motion platform interface comprises a feature unit comprising a standby state wherein said motion platform is still, said standby state being activated when said mute control is set.

12. The computer peripheral as claimed in claim 1, wherein said motion platform interface comprises a feature unit comprising a standby state wherein said motion platform is still, said standby state being activated when no digital audio-format signal is received during a predetermined time period.

\* \* \* \* \*